United States Patent [19]

Jeon et al.

[11] Patent Number: 5,708,521
[45] Date of Patent: Jan. 13, 1998

[54] ACTUATED MIRROR ARRAY FOR USE IN OPTICAL PROJECTION SYSTEM

[75] Inventors: Yong-Bae Jeon; Young-Jun Choi, both of Seoul, Rep. of Korea

[73] Assignee: Daewoo Electronics Co., Ltd.

[21] Appl. No.: 239,434

[22] Filed: May 4, 1994

[30] Foreign Application Priority Data

May 4, 1993 [KR] Rep. of Korea ............... 93-7676
May 4, 1993 [KR] Rep. of Korea ............... 93-7677

[51] Int. Cl.⁶ ............... G02B 5/08; G02B 26/08; H01L 41/04; H04R 17/00
[52] U.S. Cl. ............... 359/224; 359/291; 359/295; 359/855; 310/328; 310/366
[58] Field of Search ............... 359/224, 225, 359/246, 248, 291, 295, 323, 846, 849, 850, 855, 900; 310/328, 366; 29/25.35

[56] References Cited

U.S. PATENT DOCUMENTS

| | | | |
|---|---|---|---|
| 3,463,572 | 8/1969 | Preston, Jr. ............... | 359/295 |
| 3,904,274 | 9/1975 | Feinleib et al. ............... | 359/295 |
| 5,032,006 | 7/1991 | Grupp et al. ............... | 359/88 |
| 5,175,465 | 12/1992 | Um et al. ............... | 310/328 |
| 5,260,798 | 11/1993 | Um et al. ............... | 358/233 |
| 5,287,215 | 2/1994 | Warde et al. ............... | 359/291 |
| 5,301,404 | 4/1994 | Ochiai et al. ............... | 29/25.35 |
| 5,469,302 | 11/1995 | Lim ............... | 359/846 |
| 5,506,720 | 4/1996 | Yoon ............... | 359/224 |
| 5,552,923 | 9/1996 | Min ............... | 359/295 |
| 5,585,956 | 12/1996 | Lee et al. ............... | 359/291 |

*Primary Examiner*—Ricky D. Shafer
*Attorney, Agent, or Firm*—Anderson Kill & Olick, P.C.

[57] ABSTRACT

An M×N actuated mirror array for use in an optical projection system, comprises:

a substrate having an array of M×N openings therethrough and an array of connecting terminals, wherein each of the M×N openings is filled with a metallization and each of the connecting terminals is located on top of each of the M×N openings filled with the metallization;

an array of M×N actuators, wherein each of the M×N actuators is provided with a top surface, a bottom surface and a pair of external sides, and is comprised of a pair of electrodisplacive members, a common signal electrode located between the pair of electrodisplacive members, and a pair of reference electrodes on the pair of external sides of the actuator, respectively; and an array of M×N mirrors, wherein each of the M×N mirrors is coupled with each of the M×N actuators and is located on the top surface thereof.

2 Claims, 3 Drawing Sheets

ACTUATED MIRROR ARRAY FOR USE IN OPTICAL PROJECTION SYSTEM

FIELD OF THE INVENTION

The present invention relates to an optical projection system; and, more particularly, to an M×N actuated mirror array for use therein.

BACKGROUND OF THE INVENTION

Among the various video display systems available in the art, an optical projection system is known to be capable of providing a high quality display in a large scale. In such an optical projection system, light from a lamp is uniformly illuminated onto, e.g., an array of M×N actuated mirrors such that each of the mirrors is coupled with each of the actuators. The actuators may be made of an electrodisplacive material such as a piezoelectric or an electrostrictive material which deforms in response to an electric field applied thereto.

The reflected light beam from each of the mirrors is incident upon an aperture of a baffle. By applying an electrical signal to each of the actuators, the relative position of each of the mirrors to the incident light beam is altered, thereby causing a deviation in the optical path of the reflected beam from each of the mirrors. As the optical path of each of the reflected beams is varied, the amount of light reflected from each of the mirrors which passes through the aperture is changed, thereby modulating the intensity of the beam. The modulated beams through the aperture are transmitted onto a projection screen via an appropriate optical device such as a projection lens, to thereby display an image thereon.

In FIG. 1, there is shown a cross sectional view of the prior art M×N actuated mirror array 10 comprising a substrate 1, an array 3 of M×N actuators, e.g., 30,30',30", and a corresponding array 5 of M×N mirrors, e.g., 50,50',50". Each of the M×N actuators, e.g., 30, is provided with a top surface 34, a bottom surface 35 and a pair of external sides 40a, 40b, and comprises a pair of electrodisplacive member 31a, 31b, a common signal electrode 36 located between the pair of electrodisplacive members 31a, 31b, and a pair of reference electrodes 33a, 33b on the pair of external sides 40a, 40b of the actuator 30, respectively.

The bottom surface 30 is mounted on the substrate 1 and a mirror 50 is mounted on the top surface 34 of the actuator 30.

In copending, commonly assigned applications, U.S. Ser. No. 08/216,754, entitled "ACTUATOR ARRAY AND METHOD FOR THE MANUFACTURE THEREOF" and U.S. Ser. No. 08/216,755, entitled "MIRROR ARRAY AND METHOD FOR THE MANUFACTURE THEREOF", there are disclosed methods for manufacturing such an array of M×N actuators and for attaching the mirrors thereon.

When a voltage is applied between the common signal electrode 36 and the reference electrodes 33a, 33b, the electrodisplacive material located therebetween will deform in a direction determined by the polarity of the voltage.

To apply such a voltage, an opening 11 is formed through the substrate 1 at an intermediate location between the pair of electrodisplacive members 31a, 31b. A metallization 12 fills the hole.

In addition, a metal layer 38 is formed on the bottom surface 35 of the actuator 30 using, e.g., sputtering or vapor deposition. The bottom surface 35 is then separated, both physically and electrically, from the bottom surfaces 35', 35" of the adjacent actuators 30', 30", forming two respective recesses 39a, 39b.

Subsequently, an electrically conductive paste 13 is provided over the bottom surface 35 of the actuator 30 by using a dipping technique. Thereafter, the bottom surface 35 of the actuator 30 is mounted on the substrate 1 proximate the opening 11, providing an electrical contact between the common signal electrode 36 and the metallization 12 via the metal layer 38 and the paste 13.

In this embodiment, an addressable driver (not shown) mounted on the lower surface of the substrate 1 may then be employed to apply a voltage to the metallization 12 for a desired tilting of the mirror. The voltage may be developed in accordance with the corresponding pixel intensity.

In such an actuated mirror array, the distance between two neighboring actuators will decrease as the number of pixel increases and the electrically conductive paste is likely to spread out during the mounting of the actuators to the substrate, thereby causing short circuits between neighboring actuators and making it difficult for each of the actuators to function independently of each other.

SUMMARY OF THE INVENTION

It is, therefore, a primary object of the present invention to provide an M×N actuated mirror array for use in an optical projection system, wherein each of the actuators in the M×N actuated mirror array is capable of functioning independently of each other by making the M×N actuated mirror array short-circuit free.

In accordance with one aspect of the present invention, there is provided an M×N actuated mirror array, wherein M and N are integers comprising:

a substrate having an array of M×N openings and an array of M×N connecting terminals, each of the openings being filled with a metallization and each of the connecting terminals being located on top of each of the M×N openings filled with said metallization, wherein each of the openings filled with said metallization is electrically connected to a driver for generating an electrical signal;

an array of M×N actuators, wherein each of the M×N actuators is provided with a top surface, a bottom surface and a pair of external sides, and is comprised of a pair of electrodisplacive members, a common signal electrode located between the pair of electrodisplacive members, and a pair of reference electrodes on the pair of external sides of the actuator, respectively;

an array of M×N mirrors, wherein each of the M×N mirrors is coupled with each of the M×N actuators and is located on the top surface thereof; and an anisotropically conducting adhesive, located between said array of M×N actuators and said substrate, for holding together said array of M×N actuators and said substrate and connecting electrically each of the M×N connecting terminals and each of the openings filled with said metallization to the common signal electrode in each of the M×N actuators, thereby allowing the electrical signal from the driver to be applied to each of the actuators.

In accordance with another aspect of the present invention, there is provided an M×N actuated mirror array, wherein M and N are integers, comprising:

a substrate having an array of M×N openings and an array of M×N connecting terminals thereon, wherein each of the openings being filled with a metallization and each of the connecting terminals being located on top of each of the M×N openings filled with said metallization, wherein each of the openings filled with said metallization is electrically connected to a driver for generating an electrical signal;

an array of M×N actuators, wherein each of M×N actuators provided with a top surface, a bottom surface, and a pair of external sides, and is comprised of a pair of electrodisplacive members, a common signal electrode located between the pair of electrodisplacive members, and a pair of reference electrodes on the external sides of the actuator, respectively;

an array of M×N mirrors, wherein each of the M×N mirrors is coupled with each of the M×N actuators and is located on the top surface thereof; and an array of M×N blocking walls for preventing the spreading of the electrically conductive paste, each of the M×N blocking walls being located on top of said substrate and at an equidistance from said two adjacent connecting terminals, wherein the electrically conductive paste is used for connecting electrically each of the connecting terminals, each of the openings filled with said metallization with the common signal electrode in each of the actuators, thereby allowing the electrical signal from the driver to be applied to each of the actuators.

BRIEF DESCRIPTION OF THE DRAWINGS

The above and other objects and features of the present invention will become apparent from the following description of preferred embodiments given in conjunction with the accompanying drawings, wherein.

DETAILED DESCRIPTION OF THE PREFERRED EMBODIMENTS

Figure 1:
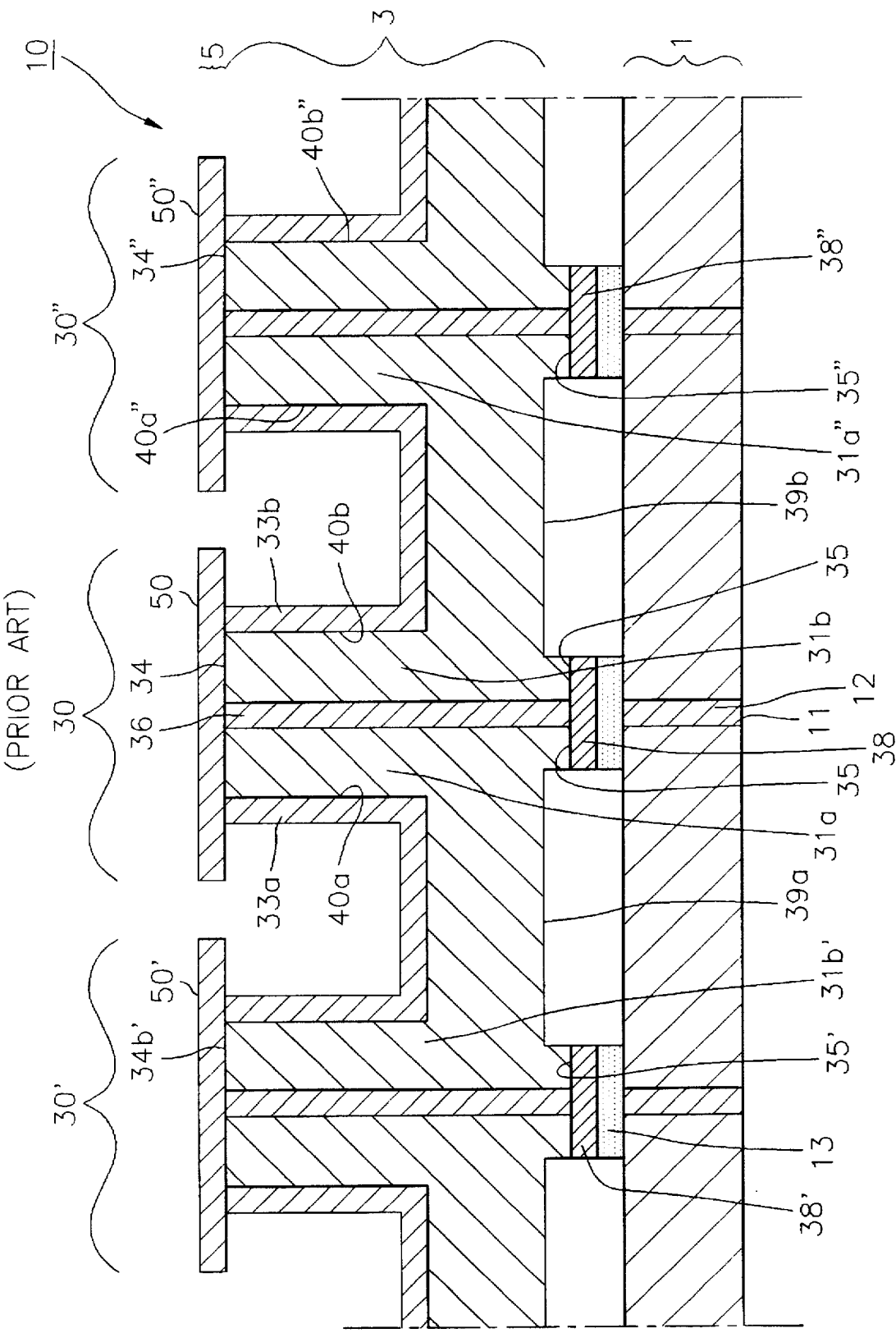
FIG. 1 presents a cross sectional view of a prior art M×N actuated mirror array.
Figure 2:
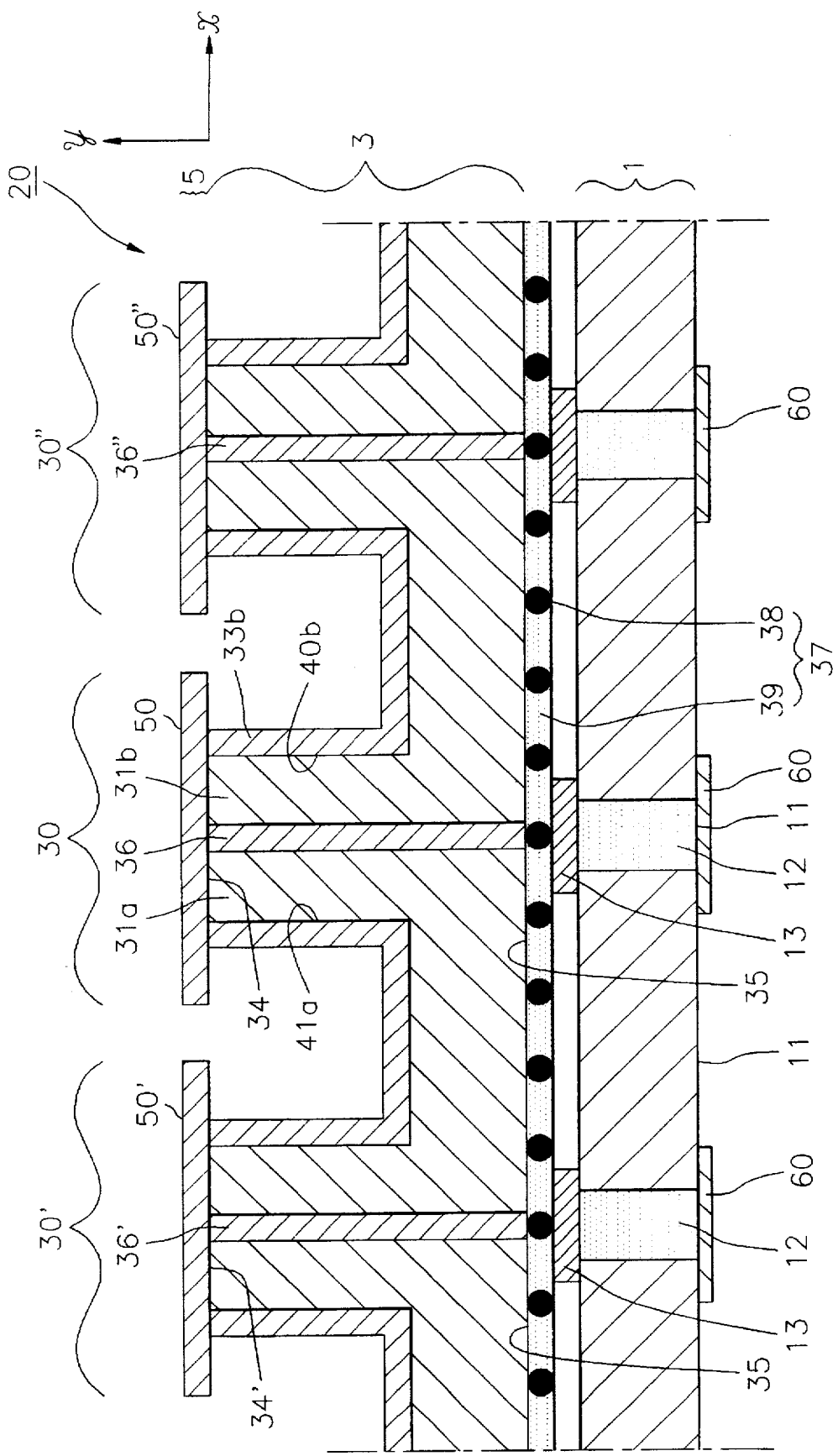
FIG. 2 illustrates a cross sectional view of an M×N actuated mirror array of a preferred embodiment of the present invention.

There is shown in FIG. 2 a cross sectional view of an M×N actuated mirror array of a preferred embodiment of the present invention, wherein x and y represent two mutually perpendicular axes.

As shown in FIG. 2, the M×N actuated mirror array 20 comprises a substrate 1, an array 3 of M×N actuators, e.g., 30, 30', 30" and a corresponding array 5 of M×N mirrors, e.g., 50, 50', 50".

As described in the copending, commonly assigned application, U.S. Pat. No. 5,543,959, issued on Aug. 6, 1996, entitled "ACTUATOR ARRAY AND METHOD FOR THE MANUFACTURE THEREOF", each of the M×N actuators, e.g., 30, is provided with a top surface 34, a bottom surface 35 and a pair of external sides 40a, 40b, and is comprised of a pair of electrodisplacive members 31a, 31b, a common signal electrode 36 located between the pair of electrodisplacive members 31a, 31b, and a pair of reference electrodes 33a, 33b on the pair of external sides 40a, 40b of the actuator 30, respectively(as all of the actuators, e.g., 30, 30', 30", are identical, the following description will be given with respect to the representative actuator 30).

The electrodisplacive members are comprised of an electrodisplacive material such as a piezoelectric material, e.g., lead zirconium titanate(PZT), or an electrostrictive material, e.g. lead magnesium niobate-lead titanate(PMN-PT).

On the top surface 34 of the actuator 30, a mirror 50 is mounted by using, e.g., the method disclosed in another copending, commonly owned application, U.S. Ser. No. 08/216,754, entitled "MIRROR ARRAY AND METHOD FOR THE MANUFACTURE THEREOF". The bottom surface 35 of the actuator 30 is mounted on the substrate 1.

When a voltage is applied between the common signal electrode 36 and the reference electrodes 33a, 33b, the electrodisplacive material located between them will deform in a direction determined by the polarity of the voltage.

To apply such a voltage, a metallization 12 is formed on the substrate by way of, e.g., first forming an array of M×N openings on the substrate 1, and then filling the openings with a metal in such a way that the metallization 12 is made to be in an electrical contact with each of the connecting terminals 13 made of a metal, e.g., Al.

In addition, an anisotropically conducting adhesive 37, comprising conductive metal particles 38 distributed randomly over an insulating adhesive 39, e.g., an epoxy, is provided over the bottom surface 35 of the actuator 30 prior to the mounting thereof on the substrate.

The anisotropically conducting adhesive 37 is hydrothermally pressed during the mounting of the actuator 30 to the substrate 1. When heat is applied to the anisotropically conducting adhesive 37, the insulating adhesive 39 therein will melt, thereby holding together the substrate 1 and the actuator 30, and some of the conducting metal particles 38 therein will come into contact with the connecting terminal 13 and the common signal electrode 36 simultaneously, thereby establishing an electrical connection therebetween.

In other words, the anisotropically conducting adhesive 37 makes it possible to obtain an actuated mirror array which will be electrically conductive in the y-direction while electrically insulated in the x-direction, thereby electrically insulating each of the actuators, e.g., 30, from neighboring actuators, e.g., 30',30".

Figure 3:
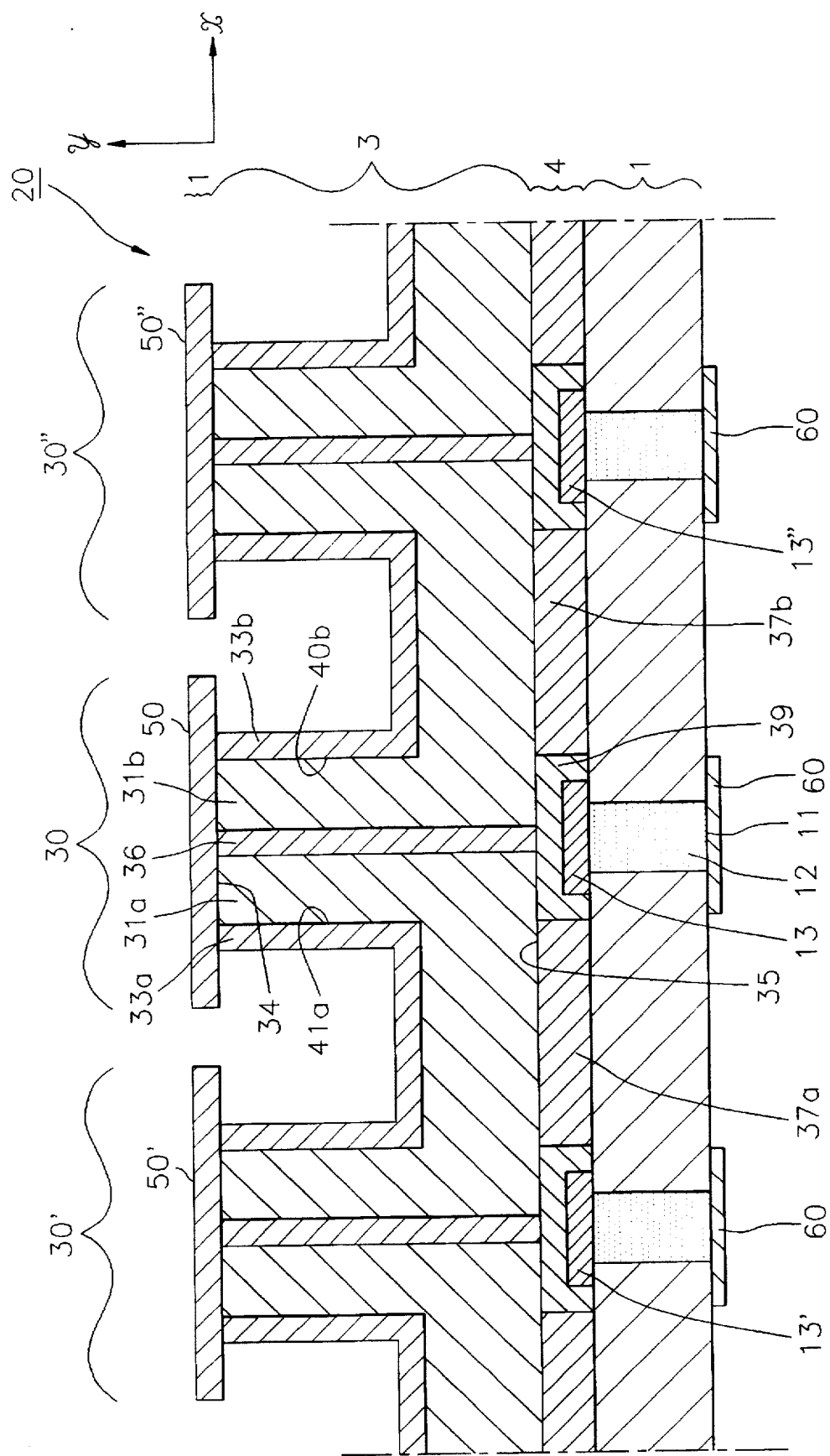
FIG. 3 depicts a cross sectional view of an M×N actuated mirror array of another preferred embodiment of the present invention.

Alternatively, there is shown in FIG. 3 a cross sectional view of an M×N actuated mirror array 20 of another preferred embodiment of the present invention. Prior to the mounting of the actuator 30 to the substrate 1, there is formed, on top of the substrate 1, an array 4 of M×N blocking walls, e.g., 37a, 37b for physically preventing the spreading of the electrically conductive paste 39 during the mounting of the actuator, wherein each of the M×N blocking walls, e.g., 37b, made of an insulating adhesive material, e.g., UV glue, is located at an equidistance from two neighboring connecting terminals, e.g., 13, 13", to thereby electrically insulate each of the M×N actuators, e.g., 30, from the neighboring actuators, e.g., 30',30".

In either of the embodiments, an addressable driver 60 mounted to the lower surface of the substrate 1 may be employed to apply a voltage to the metallization 12 for a desired tilting of the mirror. The voltage may be developed in accordance with the corresponding pixel intensity in an optical projection system.

While the present invention has been shown and described with reference to the particular embodiments, it will be apparent to those skilled in the art that many changes and modifications may be made without departing from the spirit and scope of the invention as defined in the appended claims.

What is claimed is:

1. An M×N actuated mirror array, wherein M and N are integers, comprising:

a substrate having an array of M×N openings and an array of M×N connecting terminals thereon, each of the openings being filled with a metallization and each of the connecting terminals being located on top of each of the M×N openings filled with the metallization, wherein each of the openings filled with said metallization is electrically connected to a driver for generating an electrical signal;

an array of M×N actuators, wherein each of the M×N actuators is provided with a top surface, a bottom surface, a pair of external sides, and is comprised of a pair of electrodisplacive members, a common signal electrode located between the pair of electrodisplacive members, and a pair of reference electrodes on the pair of external sides of the actuator, respectively;

an array of M×N mirrors, wherein each of the M×N mirrors is coupled with each of the M×N actuators and is located on the top surface thereof; and an array of M×N blocking walls for preventing the spreading of an electrically conductive paste, each of the blocking walls being located on the top surface of said substrate and at an equidistance from two adjacent connecting terminals, wherein the electrically conductive paste is for connecting electrically each of the connecting terminals, each of the openings filled with said metallization with the common signal electrode in each of the actuators, thereby allowing the electrical signal from the driver to be applied to each of the actuators.

2. The M×N actuated mirror array of claim 1, wherein each of said blocking walls is comprised of an insulating adhesive material.

* * * * *

UNITED STATES PATENT AND TRADEMARK OFFICE
CERTIFICATE OF CORRECTION

PATENT NO. : 5,708,521

DATED : January 13, 1998

INVENTOR(S) : Yong-Bae Jeon, et al

It is certified that error appears in the above-identified patent and that said Letters Patent is hereby corrected as shown below:

On the title page item

{73} Assignee: Daewoo Electronics Co., Ltd., Seoul, Rep. of Korea

Signed and Sealed this

Twenty-sixth Day of May, 1998

Attest:

BRUCE LEHMAN

Attesting Officer

Commissioner of Patents and Trademarks